United States Patent [19]

Brasington

[11] Patent Number: 4,852,031

[45] Date of Patent: Jul. 25, 1989

[54] COCKPIT SIMULATOR INTERFACING TO KEYBOARD PORT OF DESKTOP COMPUTER

[75] Inventor: Frank C. Brasington, Melbourne, Fla.

[73] Assignee: Novel Twist Inc., Melbourne, Fla.

[21] Appl. No.: 73,097

[22] Filed: Jul. 14, 1987

[51] Int. Cl.⁴ .......................... G09B 9/08; G06F 15/50
[52] U.S. Cl. ..................................... 364/578; 364/521; 434/45
[58] Field of Search ........................ 434/30, 43, 45, 49; 272/1 C; 273/DIG. 28, 148 B; 244/223, 228; 364/578, 801, 518, 522

[56] References Cited

U.S. PATENT DOCUMENTS

| | | | |
|---|---|---|---|
| 4,280,285 | 7/1981 | Haas | 434/30 |
| 4,281,994 | 8/1981 | Dell et al. | 364/578 |
| 4,573,925 | 3/1986 | Styers | 434/49 |
| 4,599,070 | 7/1986 | Hladky et al. | 244/223 |
| 4,659,313 | 4/1987 | Kuster et al. | 434/45 |
| 4,677,576 | 6/1987 | Berlin, Jr. et al. | 434/43 |
| 4,713,007 | 12/1987 | Alban | 434/45 |

*Primary Examiner*—Felix D. Gruber
*Attorney, Agent, or Firm*—Antonelli, Terry & Wands

[57] ABSTRACT

A mockup device interfaces directly with the keyboard port of a desktop (personal) computer and requires no additional or specialized adapter. A hardware mockup of an aircraft cockpit control panel, including instruments, switches and control yoke, includes an interface unit through which digital signals that replicate keystroke sequences employed by flight simulation application software are generated. The interface unit is coupled with and responds to the physical manipulation of the control elements of the cockpit control panel mockup, so that control panel manipulative action of the computer user 'pilot' causes the generation and delivery of keystroke representative signals to the keyboard port of the computer. In response to these keystroke representative signals the flight simulation software that has been loaded into the computer controls the flight simulation display just as though the user were operating the system directly from the keyboard. However, because the interface unit produces the command sequences in response to the manipulation of dedicated control/switch elements corresponding to those on an actual cockpit control panel and at a signalling rate that far exceeds the manipulative keystroke action of the computer user, the flight simulation display on the computer monitor is presented effectively in near real time, thereby creating a more realistic simulation of flight conditions to the 'pilot' user.

26 Claims, 5 Drawing Sheets

FIG. 4A

| EDITOR SEL | ENTER ENTRY | VIEW LF FWD | VIEW AHEAD | VIEW, RT FWD |
|---|---|---|---|---|
| 09 | 08 | 07 | 06 | 05 |
| 01 | 1C | 46, 47 | 46, 48 | 46, 49 |
| EDITOR ARROW UP | VIEW LEFT | VIEW DOWN | VIEW RIGHT | VISUAL SEL |
| 19 | 18 | 17 | 16 | 15 |
| C | 46, 48 | 46, 4C | 46, 4D | 46 |
| NUM PAD 0 | ENTRY BACKSPACE | VIEW LF REAR | VIEW REAR | VIEW RT REAR |
| 29 | 28 | 27 | 26 | 25 |
| B | E | 46, 4F | 46, 50 | 46, 51 |
| NUM PAD 7 / BANK LEFT | NUM PAD 8 / MOVE NORTH | NUM PAD 9 / BANK RIGHT | INSERT MODE | SAVE MODES |
| 39 | 38 | 37 | 36 | 35 |
| 8 / 47 | 9 / 48 | A / 49 | 52 | 1F |
| NUM PAD 4 / MOVE WEST | NUM PAD 5 / FREEZ | NUM PAD 6 / MOVE EAST | RECALL MODE | LOAD |
| 49 | 48 | 47 | 46 | 45 |
| 5 / 4B | 6 / 4C | 7 / 4D | 37 | 26 |
| NUM PAD 1 / HEADING LEFT | NUM PAD 2 / MOVE SOUTH | NUM PAD 3 / HEADING RIGHT | CONTROLS CENTER | ALT FUNCTION |
| 59 | 58 | 57 | 56 | 55 |
| 2 / 4F | 3 / 50 | 4 / 51 | 4 C | 45 ?? |
| SLEW PITCH UP | SET SLEW ATTITUDE | SLEW ALT INC | LOAD SCENERY DISK | TRANS GHz INC |
| 69 | 68 | 67 | 66 | 65 |
| 3 B | 38 | 3C | 1D, 12 | 14, D |
| SLEW PITCH STOP | TRANSFER E | SLEW ALT STOP | MAGNETOS - LEFT | MAGNETOS BOTH |
| 79 | 78 | 77 | 76 | 75 |
| 3 F | 14 | 40 | 32, 3 | 32, 5 |
| SLEW PITCH DN | SLEW ALT DEC | MAGNETOS OFF | MAGNETOS RIGHT | START ENGINE |
| 89 | 88 | 87 | 86 | 85 |
| 43 | 44 | 32, 2 | 32, 4 | 32, 6 |

FIG. 4B

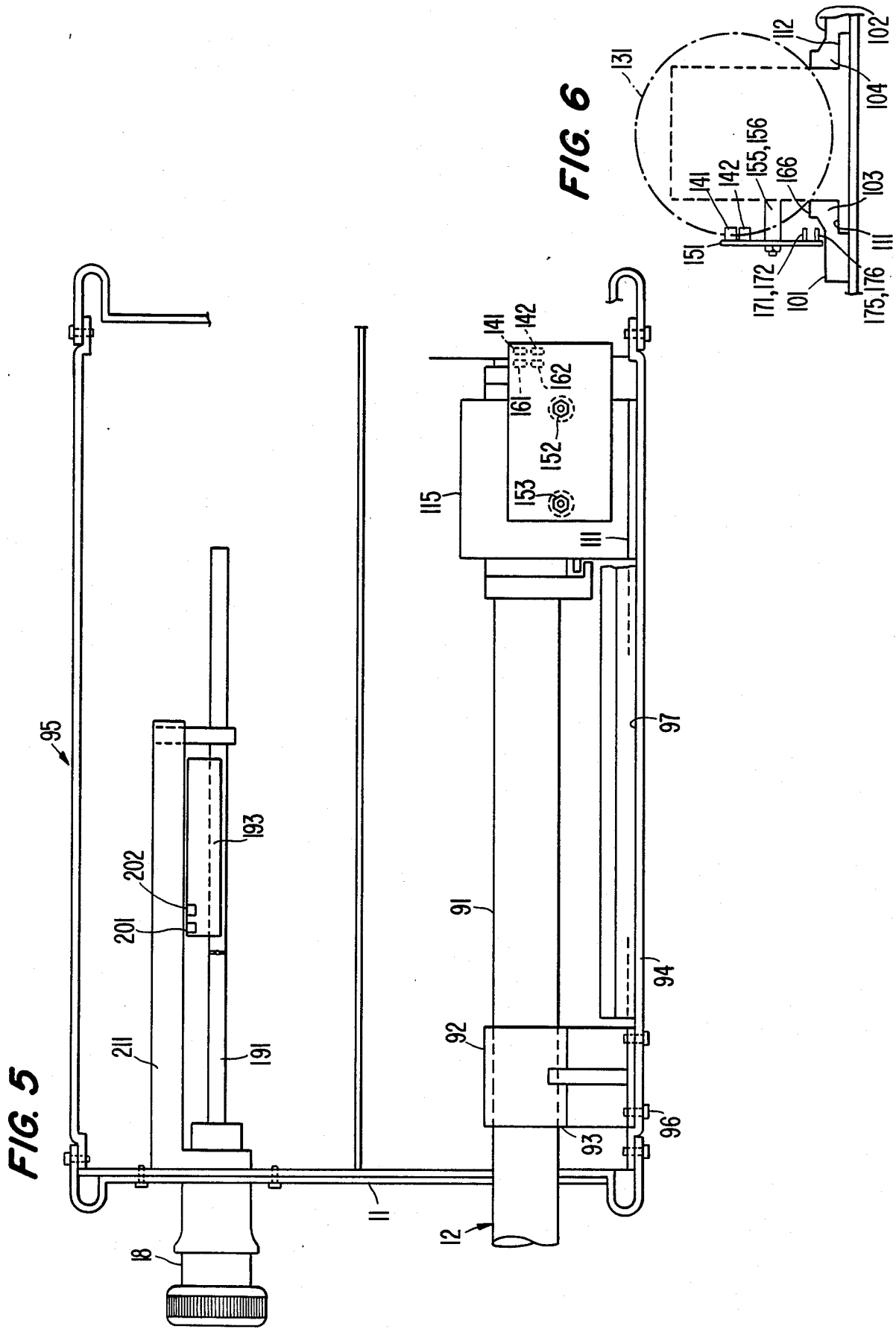

COCKPIT SIMULATOR INTERFACING TO KEYBOARD PORT OF DESKTOP COMPUTER

FIELD OF THE INVENTION

The present invention relates in general to computer-based simulator devices and is particularly directed to an apparatus for simulating the control of a vehicle such as an aircraft through the use of a cockpit mockup apparatus that directly interfaces with the keyboard input port of a desktop (personal) computer.

BACKGROUND OF THE INVENTION

The proliferation of the personal computer has given rise to the development of a substantial variety of attendant hardware and software that is customized to meet the needs of a particular industry or application. In the educational/recreational market, for example, the personal computer owner has available to him a myriad of application software that enables the personal computer to simulate a specific type of apparatus, the user interfacing with the computer by means of its associated monitor and keyboard (or mouse or joystick). In addition to an almost endless variety of games that may be played on the personal computer the software industry has developed other forms of dynamic application programs, such as vehicle (e.g. automobile, aircraft) control training/simulation systems, through which the personal computer user may be presented with a monitor display of a simulated action (e.g. flight) condition. Using a cockpit simulator program, as an illustration, the computer user is typically presented with a display of a cockpit control panel and windscreen perspective view outside the aircraft. By keying-in specified sequences of control commands from the computer keyboard, the user is effectively able to 'fly' an aircraft whose simulated cockpit flight conditions are displayed on the display monitor. Obviously, such flight simulation systems require very sophisticated programs in order to enable the user to experience all of the aspects of the aircraft's flight. Consequently, the computer user is typically required to employ multiple keystrokes in the course of inputting aircraft control commands, a slow interface process which detracts from the intended simulated realism of the system.

Of course there do exist mockup or specialized hardware devices that contain the control motion elements, instruments and switches of a cockpit control console. However such devices are usually stand alone units and require a special interface adapter that connects with the computer backplane or a signalling port at the rear of the computer chassis. It goes without saying that such configurations are not only expensive but require a modification of existing hardware. In addition they are not designed to be used with existing software packages, since the latter require use of the computer keyboard, an unwanted burden to the custom hardware approach.

SUMMARY OF THE INVENTION

In accordance with the present invention, the inherently slow interface time and lack of hands-on realism encountered when using a computer keyboard to input commands to an applications program simulating a dynamic condition to the computer user, such as a flight simulation program, is obviated by a mockup device that interfaces directly with the computer's keyboard port and requires no additional or specialized adapter. Pursuant to the invention, a hardware mockup of an aircraft cockpit control panel, including instruments, switches and control yoke, includes an interface unit through which digital signals that replicate keystroke sequences employed by flight simulation application software are generated. The interface unit is coupled with and responds to the physical manipulation of the control elements of the cockpit control panel mockup, so that control panel manipulative action of the computer user-'pilot' causes the generation and delivery of keystroke command representative signals to the keyboard port of the computer. In response to these keystroke representative signals the flight simulation software that has been loaded into the computer controls the flight simulation display just as though the user were operating the system directly from the keyboard. However, because the interface unit produces the command sequences in response to the manipulation of dedicated control/switch elements corresponding to those on an actual cockpit control panel and at a signalling rate that far exceeds the manipulative keystroke action of the computer user, the flight simulation display on the computer monitor is presented effectively in near real time, thereby creating a more realistic simulation of flight conditions to the 'pilot' user.

BRIEF DESCRIPTION OF THE DRAWINGS

FIGS. 5 and 6 show respective side and end views of the configuration of a control yoke and a throttle, together with associated electrooptic sensor units for generating signals representative of displacement of the yoke and throttle.

DETAILED DESCRIPTION

Figure 1:
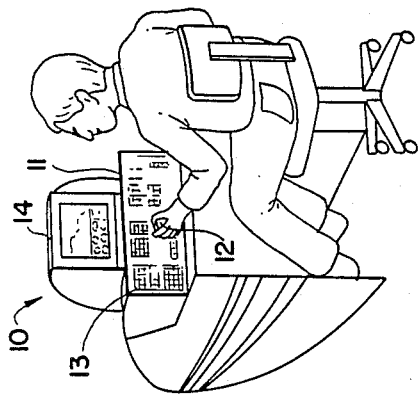
FIG. 1 is a pictorial illustration of a vehicle control simulation apparatus in accordance with the present invention.

Before describing in detail the particular improved vehicle control simulator apparatus in accordance with the present invention, it should be observed that the present invention resides primarily in a novel structural combination of conventional data/signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood. Of course, where the mechanical configuration and arrangement of hardware components are pertinent to the structure and operation of the invention, a detailed illustration and description of the same will be provided.

A vehicle control simulation apparatus in accordance with the present invention is pictorially illustrated in FIG. 1 as comprising a mockup 10 of a cockpit console of an aircraft in the form of a control panel 11 and a control yoke 12, together with a desktop (personal) computer 13 having a display monitor 14 and a keyboard (not shown). Control panel 11 preferably contains a plurality of input control switches 15 which correspond to th control switches found on the simulated control panel of an aircraft as produced on display monitor 14 by flight simulation software executed by computer 13. One example of such flight simulation software with which the present invention may be employed is a commercially available program entitled "Flight Simulator" (copyrighted by Bruce A. Artwick, 1982, 1984; and Microsoft Corp., 1982, 1984). As will be described in detail below with reference to FIGS. 3–6, unlike the simulated switch icons produced by the flight simulation software being run on computer 13, the control switches 15 of control panel 11 and control yoke 12 may be physically manipulated, just as in an actual aircraft cockpit, and thereby give the mockup user a more realistic 'feel' of the cockpit environment during the simulated flight of the aircraft.

Figure 2:
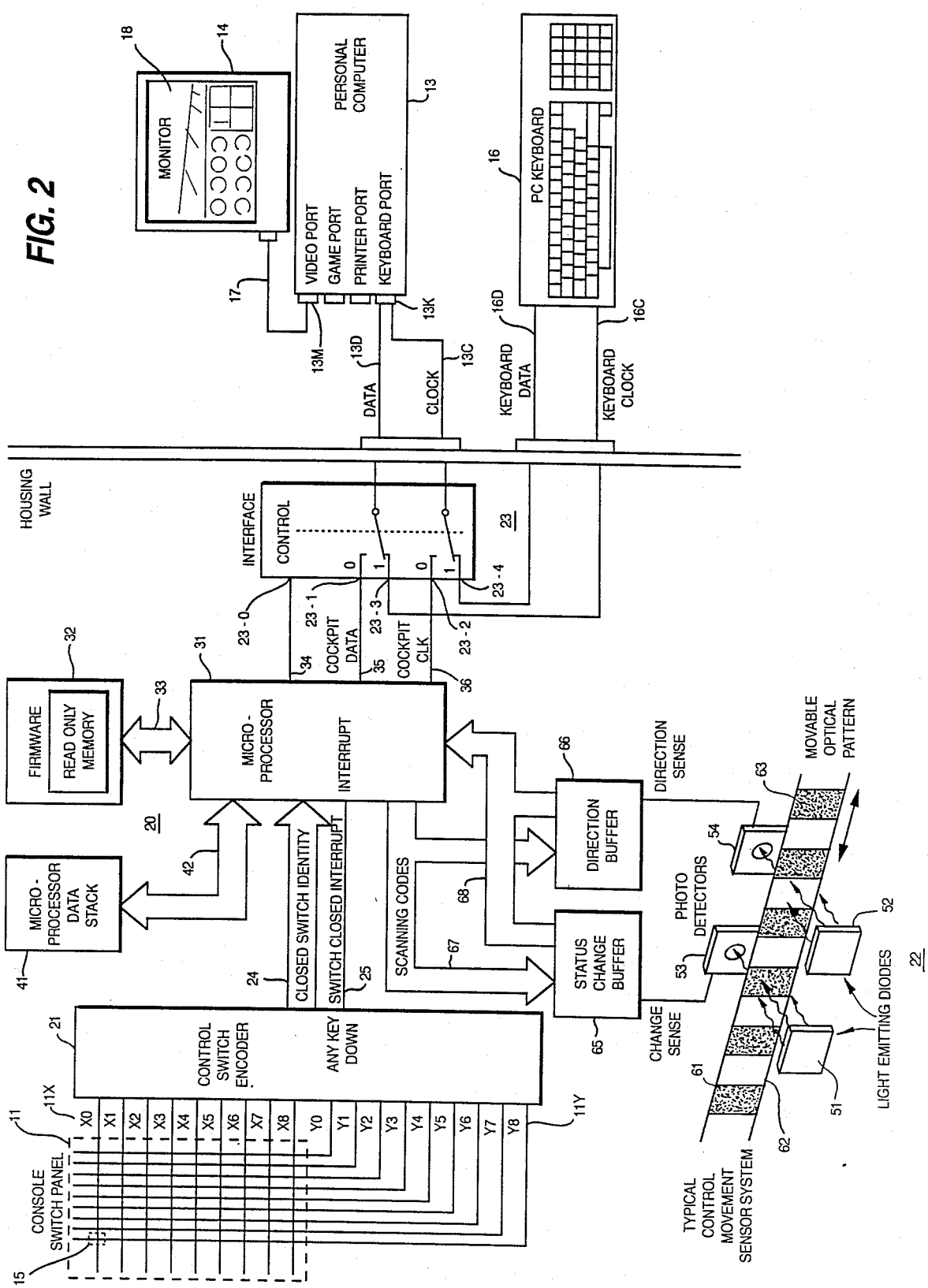
FIG. 2 is a block diagram of the signal processing-/interface components that make up of the flight simulation apparatus of the present invention pictorially illustrated in FIG. 1.

Referring now to FIG. 2, the signal processing/interface components that make up of the flight simulation apparatus of the present invention pictorially illustrated in FIG. 1 are diagrammatically shown as including a signal processing stage 20 and a set of associated signal interface units 21, 22 and 23 respectively coupled between signal processing stage 20 and control panel 11, control yoke 12 and computer 13 (including display monitor 14 and keyboard 16). Signal processing stage 20 is a processor-based input command assembly unit which responds to the operation of control switches 15 of control panel 11 and the movement of control yoke 12 and generates prescribed sequences of keystroke input command codes for delivery to a keyboard input port 13K through which personal computer 13 is normally connected to an associated keyboard 16. As described briefly above, these keystroke input command codes are comprised of digital signals that replicate keystroke sequences employed by the flight simulation software to create aircraft response images to the 'pilot' on display monitor 14, in the form of scene as would normally be viewed by the pilot observer via the aircraft windscreen, imaged on display monitor 14 immediately above the cockpit control console. In response to these keystroke representative signals, the flight simulation software that has been loaded into the computer controls the flight simulation display just as though the user were operating the system directly from keyboard 16. However, because signal processing stage 20 produces input command signals in response to the physical manipulation of the yoke 12 and control switches 15 on control panel 11 and at a signalling rate that far exceeds the manipulative keystroke action of the computer user, the flight simulation display on monitor 14 is presented effectively in near real time, thereby creating a more realistic simulation of flight conditions to the 'pilot' user.

The control switches 15 of control panel 11 are diagrammatically illustrated in FIG. 2 in the form of contact crosspoints of respective columns 11X and rows 11Y of a matrix of conductors, through the interconnection of which address signals, for accessing the contents of a keystroke command sequence read only memory 32 within signal processing stage, are produced. Preferably read only memory 32 is configured in monolithic form, such as a replaceable cartridge (containing a read only memory chip and associated address latches), so as to enable the apparatus to be adaptable to a variety of applications and thereby be tailored, as desired, to a user-chosen application program. This versatility permits a user to change the application simulated by the mockup simply by changing the control switch overlay of control panel 11 (to be described below), together with a corresponding change in firmware (replacement of the application cartridge of read only memory 32).

As will be described in greater detail below with reference to FIGS. 3 and 4, the operation of a respective control switch 15 of control panel 11 places a prescribed voltage level on each of a respective one of the conductors of columns 11X and rows 11Y. These voltage levels are translated by a control switch encoder unit 21 into an address code supplied over link 24 and an interrupt signal over link 25 to a keystroke sequence controller 31 of signal processing stage 20. Keystroke sequence controller 31 preferably comprises a commercially available microprocessor, such as an Intel 8031 processor, or other appropriate architecture, and operates to accept input signals from input devices of control panel 11, access keystroke codes from read only memory 32 and output the accessed keystroke commands codes to the keyboard input port 13K of computer 13. (A source code program for the operation of the controller 31 is set forth in an Appendix A which has been submitted with the filing of the present application and is part of the file history thereof.)

In response to the interrupt signal on link 25 keystroke sequence controller 31 reads the address code on link 24, indicative of which switch 15 of control panel 11 has been manipulated, so that keystroke sequence controller 31 may access the requisite keystroke command sequence from memory 32 for delivery to the keyboard input port 13K of computer 13 by way of a keystroke sequence controller output interface unit 23.

Keystroke sequence controller output interface unit 23 is comprised of a 2:1 multiplexer having a first pair of inputs 23-1, 23-2 coupled to the data and clock outputs 35 and 36 of keystroke sequence controller 31, a second pair of inputs 23-3, 23-4 coupled to the data and clock lines 16D and 16C, respectively, of keyboard 16 and a control input 23-C coupled over line 34 coupled to keystroke sequence controller 31. In the absence of control/yoke manipulation representative signals from control panel 11 or yoke 12, the state of line 34 is such that keyboard output lines 16D and 16C are coupled to input lines 13D and 13C, respectively of keyboard input port 13 of computer 13. In response to aircraft control signals, however, keystroke sequence controller 31 changes the state of control line 34, so that keyboard 16 is effectively electrically decoupled from computer 13 and, instead, computer 13 receives keystroke equivalent input commands from keystroke sequence controller 31 (as accessed from memory 32).

As noted above, keystroke sequence controller 31 of signal processing stage 20 is also coupled to respond to the manipulation of displaceable input devices, such as the throttle and control yoke. For this purpose, each displaceable input device may have an associated movement sensor unit 22 (to be described in detail below with reference to FIGS. 5 and 6) which is arranged to be coupled with a displaceable shaft of the input unit (e.g. control yoke) by means of a set of motion sensor transducers, diagrammatically shown in FIG. 2 as comprising light emitting diodes units 51,52 and mutually aligned photodetector units 53,54 spaced apart therefrom by displaceable optical pattern elements 61, associated with movement of the displaceable input unit. Each optical pattern element 61 preferably comprises a plastic film element (e.g. in the form of a strip for detecting rectilinear movement and in the form of a disk for detecting rotational movement) having alternating light transmissive regions 62 and opaque regions 63, so that movement of a pattern between a diode/photodetector pair will chop the light beam emitted by a light emitting diode and received by its associated photo detector The photodetector, in turn, produces an alternating or chopped output signal representative of (axial/rotational) displacement.

For each respective direction of displacement of the input, a set of two diode/photodetector pairs is employed to sense the motion (i.e. a change in state) and the direction of the change in motion. More particularly, the diode/photodetector pairs of a set are arranged side-by-side, as diagrammatically shown in FIG. 2. In response to movement of the optical pattern 61 each of photodetectors 53 and 54 produces a chopped output signal, which is coupled to respective change and direction buffers 65 and 66, the contents of which are repeatedly periodically scanned by sampling codes supplied by keystroke sequence controller 31 over link 67. Preferably each of buffers 65 and 66 is comprised of a set of threshold sensitive circuits (e.g. Schmitt trigger circuits) and a multi-input buffer coupled to the outputs of the Schmitt trigger circuits Whenever the input device (e.g. control yoke) is displaced, the change in state of the output of photodetector 53 causes its associated Schmitt trigger circuit to present a corresponding change in binary level output to buffer 65. This change-in-state signal causes the keystroke sequence controller to sample the alternating signal produced by photodetector 54, via buffer 66. The rate of change of the output of photodetector 54 depends upon the rate of movement of the input device and the period of time that the output of photodetector 54 is chopped depends upon the length of time that the input device is being displaced. As the output of buffer is sampled the signals are employed by keystroke sequence controller 31 to generate memory address codes for accessing keystroke-equivalent commands from memory 32 to be coupled to the keyboard input port of computer 13.

In the course of operating the flight simulation apparatus of the present invention, the computer operator may physically manipulate an input signal generation device in such a manner which causes signals to be input to keystroke sequence controller 31 at a rate faster than corresponding keystroke-equivalent command codes accessed from memory 32 can be processed by computer 13. This increased signal generation rate typically occurs during movement of the control yoke 12. In order to ensure that there is no loss of data during this action, keystroke sequence controller 31 contains a 'stacking' software subroutine (such as that itemized in the program set forth in Appendix A) which causes input signals to be stacked until computer 13 is ready to accept another keystroke-equivalent command sequence (accessed from memory 32). To handle multiple input device inputs from control panel 11 (including yoke 12) at the same time, the stacking subroutine may assign separate stacks of different input signals.

Figure 3:
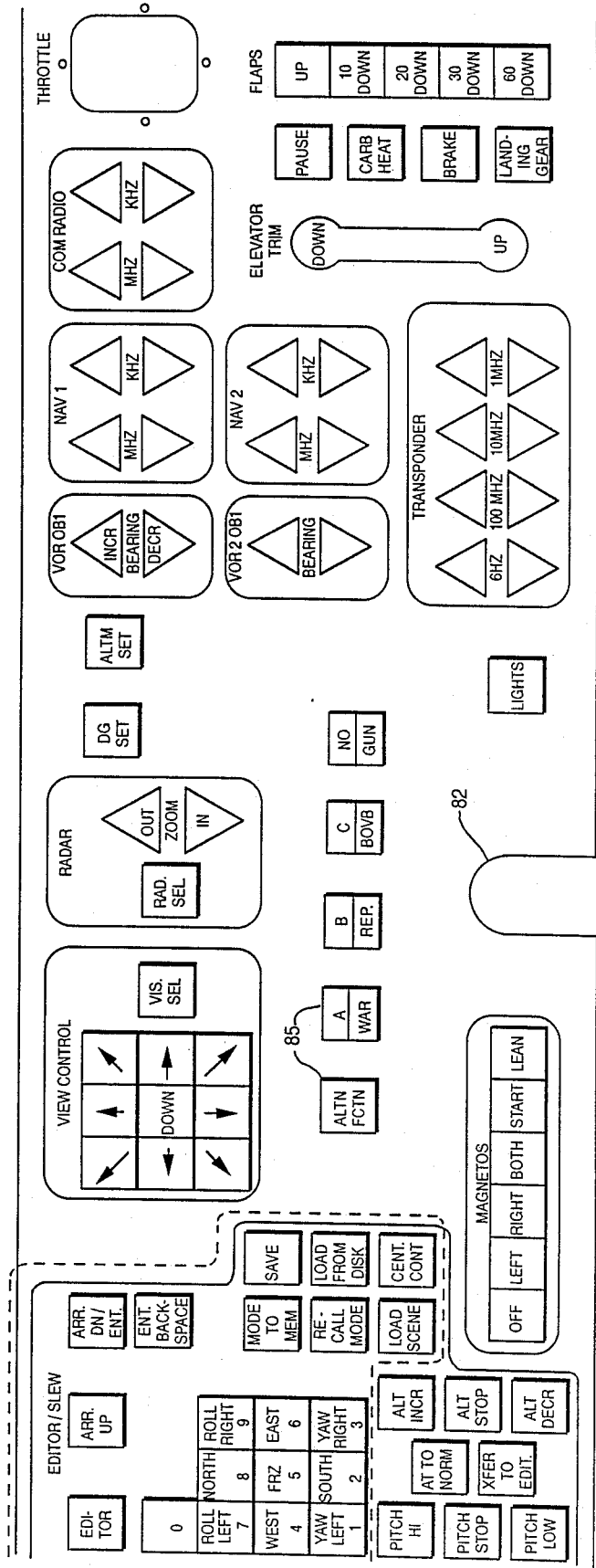
FIG. 3 shows a cockpit control panel overlay on which are arranged a plurality of control switch elements.
Figures 4A, 4B:
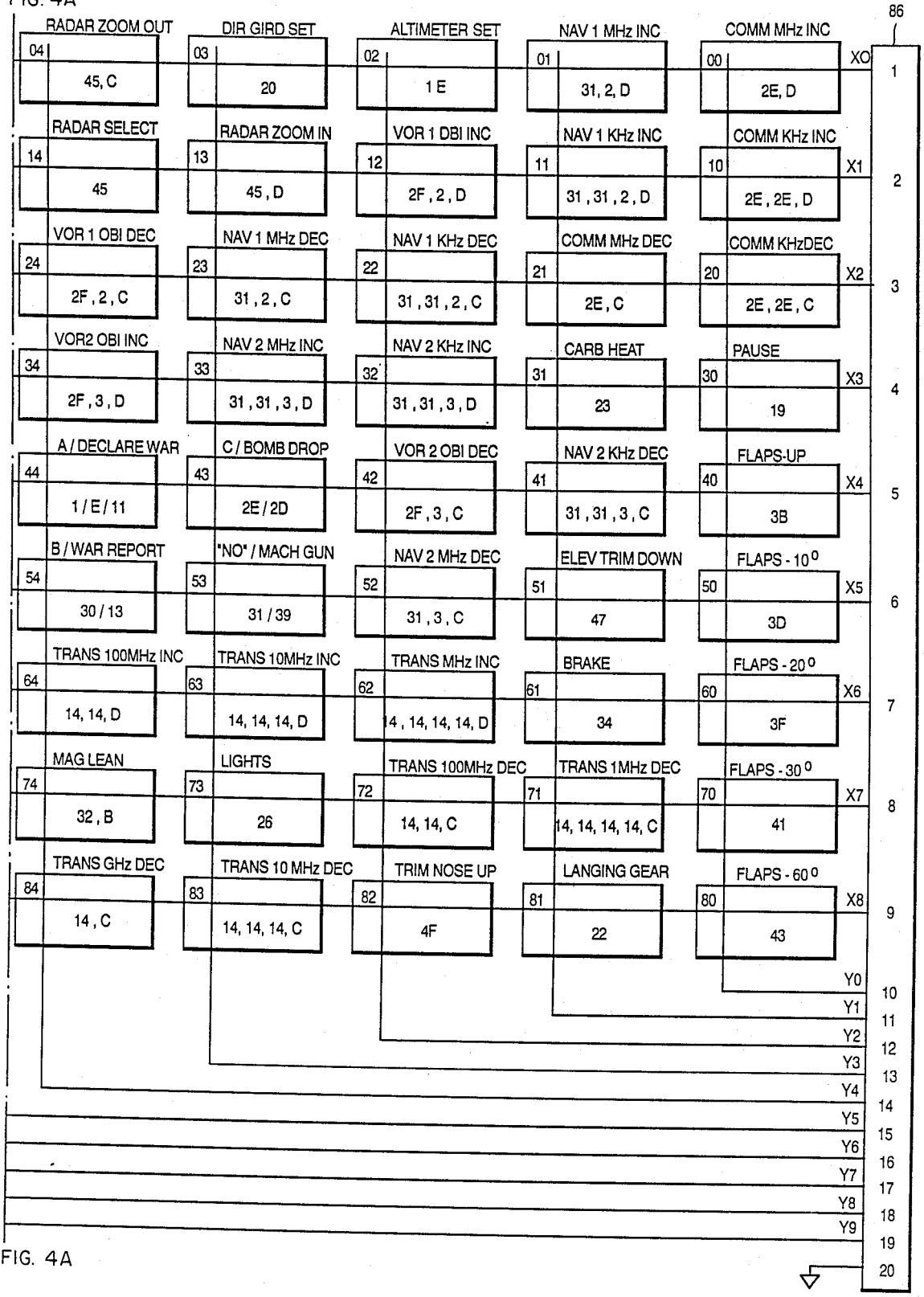
FIG. 4 depicts a conductor matrix panel member to be used in conjunction with the cockpit control panel overlay shown in FIG. 3.

Referring now to FIG. 3 there is shown an example of a control panel overlay 80 on which are arranged a plurality of control switch elements 15 to be employed in the execution of the application program that has been loaded into computer 13 and which replace the functionality that would otherwise be carried out by keyboard 16. As shown in FIG. 3, for the presently described example of a cockpit flight simulation program, in addition to typical cockpit control panel switches for generating input commands to the application program, the control panel overlay contains a set of computer function key elements, delineated within overlay region 81, so as to enable the computer user to have total supervision of the execution of the flight simulation program without the use of keyboard 16.

In terms of its physical configuration, control panel overlay 80 may comprise a plastic sheet containing a plurality of flexible (e.g. plastic) elements 85, each being labelled with a prescribed control function according to the flight simulation program to be executed (e.g. the above-mentioned "Flight Simulator" program) and arranged in a manner to provide the user with practical realism of a cockpit control console. Each flexible element 85, when depressed, causes the closure of a crosspoint conductor pair resident on an underlying conductor matrix panel member, shown in FIG. 4. As shown therein, the conductor matrix panel member, which is preferably formed of a sheet of insulator material, such as polycarbonate plastic, contains a matrix of row conductors 11Y and column conductors 11X, supported in spaced apart relationship by a layer of insulator material 87 therebetween with windows 88 formed in layer 87 to permit conductive contact between respective mutually overlapping conductors 11X, 11Y in response to the flexible switch elements 81 being depressed against the windows The conductors of the matrix terminate at a pin connector 86, the pin locations of which are combined in pairs by control switch encoder 21 (FIG. 1) to generate address codes for accessing keystroke command codes from read only memory 32.

Referring now to FIGS. 5 and 6, there are shown respective side and end views of the configuration of control yoke 12 and a throttle 18, together with associated electrooptic sensor units for generating signals representative of displacement of the yoke and throttle. Yoke 12 includes a shaft 91, supported by way of a U-shaped sleeve member 92 having a cylindrical guide 93 through which shaft 91 passes. Sleeve member 92 is affixed to the sidewall 94 of a cockpit mockup housing 95 by way of screws 96, as shown. Also mounted to sidewall 94 of cockpit mockup housing 95 are a pair of slide rails 101 and 102 having hold-down flanges 103 and 104, which retain respective slidable feet portions 111 and 112 of a yoke slider block 115. Yoke slider block has a journalled interior cylindrical regions through which shaft 91 passes to be supported by pair of bearings 121, 122 at opposite ends thereof mounted at opposite ends of the yoke slider block. Mounted on shaft 91 adjacent to bearings 121, 122 are respective yoke retainer rings 125, 126.

Affixed to the interior end of shaft 91 is an optical modulator disk 131 having a radially extending pattern of alternately clear and opaque regions for chopping light beams generated by sets of light emitting diodes 141, 142 disposed on one side of an edge portion of the disk. Light emitting diodes 141,142 are supported on a printed circuit board 151, which contains control and signal processing circuitry for the light emitting diodes and photodetector elements of the yoke displacement detection electrooptic components and is mounted to one side of yoke slider block 115 by way of a pair of standoff elements 155, 156. Associated with light emitting diodes 141,142 are a pair of photodetector elements 161, 162 supported on printed circuit board 151 on the opposite side of disk 131, so that light emitted by diodes 141,142 and directed toward photodetector elements 161, 162 is chopped or modulated by optical disk 131 in response to the rotation of yoke shaft 91.

Detection of axial displacement of shaft 91 is accomplished by the use of an optical strip element 166 having an alternating pattern of clear and opaque regions distributed in the axial direction of shaft 91. Optical strip 166 is mounted on slide rail 111 and is positioned to pass between a pair of light emitting diodes 171, 172 and a pair of spaced apart photodetector elements 175, 176 affixed to printed circuit board 151. Movement of yoke shaft in the axial direction causes slider block 131 to slide along the interior surface 97 of housing sidewall 94, so that light emitted by diodes 171, 172 and directed toward photodetector elements 175, 176 is chopped or modulated by strip 166.

Detection of the (axial) movement of throttle 18 is accomplished in a manner similar to that for yoke shaft 91. As shown in FIG. 5, throttle 18 has a shaft 191 to which an optical strip 193 is mounted, optical strip 193 having an alternating pattern of clear and opaque regions distributed in the axial direction of the throttle shaft. Optical strip 193 is positioned to pass between a pair of light emitting diodes 201,202 and a pair of spaced apart photodetector elements (not shown) on the opposite side of optical strip 193. These light emitting diodes and photodetector pairs, and the associated control circuitry therefor, are housed on a printed circuit card supported by a throttle shaft mounting bracket 211, which is affixed to control panel 11, as shown. Movement of throttle shaft 191 in the axial direction causes optical strip 193 to pass between light emitting diodes 201, 202 and their associated photodetector elements, so that light emitted by the diodes and directed toward the photodetector elements is chopped or modulated by strip 193.

OPERATION

As pointed out previously, the vehicle control simulator apparatus according to the present invention is designed to be coupled with a desktop computer and requires the use of application software, such as the above-mentioned "Flight Simulator" program. In effect, the mockup is intended to provide operator control realism by means of simulated 'hands-on' hardware (e.g. control yoke, throttle handle, navigation and power plant parameter switches of the control panel overlay illustrated in FIG. 3) in the course of the computer user's running of the application program. In addition, the inventive system also interfaces the computer keyboard through a mockup/keyboard to computer multiplexer, so as to permit normal keyboard inputs to be supplied to the computer when the simulator is not in use.

Operation of the system is initiated by loading of the application program using either the computer keyboard or the dedicated control switches shown in region 81 of the control panel overlay of FIG. 3. Once loaded the application program is run in normal fashion, except that all inputs to the computer keyboard port 13 are derived by means of operation of switches 15 of control panel 11 rather than the keyboard 16. When a control switch 15 is operated by the depression of one of the flexible switch elements 81 overlying the conductor crosspoints 11X and 11Y, a set of switch matrix signals are delivered to control switch encoder 21. In response to these switch matrix signals encoder 21 generates an interrupt on link 25 and supplies an address code on link 24 representative of that location in read only memory 32 that contains data representative of the proper keystroke command associated with the depressed switch to be supplied to keyboard input port 13K of computer 13. Similarly, when a mechanically displaceable control element, such as control yoke 12 or throttle 18 is operated, the change in state of the outputs of their associated electrooptic sensor units, as monitored by keystroke sequence controller 31, cause controller 31 to retrieve the direction data values supplied to and stored in direction buffer 66 (and, where necessary, buffered in elastic buffer or stack 41). The retrieved data values are employed to access keystroke command sequences stored in memory 32 and coupled therefrom through interface unit 23 to the keyboard input port 13K of computer 13.

In response to these keyboard command sequence computer 13 executes the application program in its normal manner. As far as the desktop computer is concerned the keystroke sequences appear to originate from keyboard 13. To the mockup user, however, the hands-on feeling of operating control elements of a cockpit control panel significantly enhances the simulated 'flying' experience.

As noted previously, while the present invention has been described using a flight simulation program as an exemplary application program, the invention is not limited to use with this or any other type of program. By simple modification of the control panel overlay (which may include a change in displaceable hardware configuration) and the substitution of the replaceable read only memory cartridge, the mockup can be tailored to a variety of simulated dynamic control environments, such as land vehicles, ordinance delivery systems, ships, etc.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a computer having a keyboard input port to which a control keyboard is coupled for inputting input commands generated by a computer user for controlling the operation of said computer to execute an application program, and a display monitor through which a visual presentation of a result of the computer user, an apparatus enabling said computer to execute an application program for simulating the dynamic response of a vehicle in response to control commands therefor comprising:

a control panel which effectively simulates a control console of a vehicle the dynamic response of which is simulated by the execution of said application program, said control panel containing a plurality of input devices corresponding to input devices of the control console of said vehicle through which control commands for operating said vehicle are generated;

first means, coupled with said input devices of said control panel, for generating signals representative of input commands generateable by the operation of keys of said control keyboard in accordance with he application program for simulating the dynamic response of a vehicle, in response to the operation of input devices of said control panel; and second means, coupled with said first means and connectable to the keyboard input port of said computer, for coupling signals generated by said first means in response to the operation of input devices of said control panel, to the keyboard input port of said computer.

2. An apparatus according to claim 1, wherein said first means comprises memory means for storing a plurality of command codes each of which is representative of digital signals that would otherwise be generated by the operation of one or more keys of said keyboard in the course of the execution of said application program when employing said keyboard for inputting commands to said computer, and memory accessing means for selectively accessing a command code stored in said memory means in accordance with the operation of an input device of said control panel.

3. An apparatus according to claim 2, wherein said second means includes signalling means, responsive to a command code accessed from said memory means, for coupling digital signals representative of said accessed command code to the keyboard input port of said computer.

4. An apparatus according to claim 2, wherein said first means includes third means, coupled to the input devices of said control panel, for generating input command signals representative of the operation of input devices of said control panel and coupling said input command signals to said memory accessing means, in response to which said memory accessing means selectively accesses command codes stored in said memory means.

5. An apparatus according to claim 4, wherein said third means comprises a matrix of electrical switch elements the operation of a respective one of which produces a respective input command signal for accessing a command code stored in said memory means, input devices of said control panel being arranged to be adjacent to respective ones of said electrical switch elements, whereby operation of an input device by said computer user causes the operation of a respective one of said electrical switch elements and the consequential accessing of a command code stored in said memory means.

6. An apparatus according to claim 5, wherein said control panel includes an opto-electrical input device having a mechanically displaceable element and means for optically detecting the movement of said mechanically displaceable element and generating output codes representative of said movement.

7. An apparatus according to claim 6, wherein said third means includes means for controllably accessing command codes stored in said memory means in accordance with said output codes.

8. An apparatus according to claim 4, wherein said third means comprises means for controlling the rate at which said input command signals are coupled to said memory accessing means.

9. An apparatus according to claim 8, wherein said third means includes means for temporarily buffering input command signals generated in response to the operation of input devices of said control panel and coupling input command signals to said memory accessing means at a rate that is compatible with the operation of said computer in the course of its execution of said application program.

10. An apparatus according to claim 2, wherein said first means includes means for enabling said memory means to store selectively variable sets of command codes, each set being associated with a respectively different application program.

11. An apparatus according to claim 1, wherein said vehicle comprises an aircraft and said application program comprises a program for simulating the flight of said aircraft.

12. For use with a computer having a keyboard input port to which a control keyboard is coupled for inputting input commands generated by a computer user for controlling the operation of said computer to execute a flight simulation program, and a display monitor through which a visual presentation of a result of the execution of said flight simulation program may be displayed to the computer user, an apparatus for enabling said computer to execute said flight simulation program for simulating the flight response of an aircraft in response to control commands therefor comprising:

a control panel which effectively simulates a control console of an aircraft cockpit, the flight response of which aircraft is simulated by the execution of said flight simulation program, said control panel containing a plurality of input devices corresponding to input devices of the control console of said aircraft through which control commands for operating said aircraft are generated;

first means, coupled with said input devices of said control panel, for generating signals representative of input commands, generateable by the operation of keys of said control keyboard, in accordance with said flight simulation program in response to the operation of input devices of said control panel; and second means, coupled with said first means and connectable to the keyboard input port of said computer, for coupling signals generated by said first means, in response to the operation of input devices of said control panel, to the keyboard input port of said computer.

13. An apparatus according to claim 12, wherein said first means comprises memory means for storing a plurality of command codes each of which is representative of digital signals that would otherwise be generated by the operation of one or more keys of said keyboard in the course of the execution of said flight simulation program when employing said keyboard for inputting commands to said computer, and memory accessing means for selectively accessing a command code stored in said memory means in accordance with the operation of an input device of said control panel.

14. An apparatus according to claim 13, wherein said first means includes third means, coupled to the input devices of said control panel, for generating input command signals representative of the operation of input devices of said control panel and coupling said input command signals to said memory accessing means, in response to which said memory accessing means selectively accesses command codes stored in said memory means.

15. An apparatus according to claim 14, wherein said third means comprises a matrix of electrical switch elements th operation of a respective one of which produces a respective input command signal for accessing a command code stored in said memory means, input devices of said control panel being arranged to be adjacent to respective ones of said electrical switch elements, whereby operation of an input device by said computer user causes the operation of a respective one of said electrical switch elements and the consequential accessing of a command code stored in said memory means.

16. An apparatus according to claim 13, wherein said second means includes signalling means, responsive to a command code accessed from said memory means, for coupling digital signals representative of said accessed command code to the keyboard input port of said computer.

17. For use with a computer having a keyboard input port to which a control keyboard is coupled for inputting input commands generated by a computer user for controlling the operation of said computer to execute an application program, and a display monitor through which a visual presentation of a result of the execution of an application program ma be displayed to the computer user, an apparatus enabling said computer to execute an application program for simulating the response of a prescribed utility environment to control commands therefor comprising:

control input means which effectively simulates a control input device employed for operating said prescribed utility environment having a response which is simulated by the execution of said application program, said control input means containing a plurality of input devices corresponding to input devices of the control input device of said utility environment through which control commands for operating said utility environment are generated;

first means, coupled with said input devices of said control input means, for generating signals representative of input commands generateable by the operation of keys of said control keyboard in accordance with the application program for simulating the response of a utility environment, in response to the operation of input devices of said control input means; and second means, coupled with said first means and connectable to the keyboard input port of said computer, for coupling signals generated by said first means, in response to the operation of input devices of said control input means, to the keyboard input port of said computer.

18. An apparatus according to claim 17, wherein said first means comprises memory means for storing a plurality of command codes each of which is representative of digital signals that would otherwise be generated by the operation of one or more keys of said keyboard in the course of the execution of said application program when employing said keyboard for inputting commands to said computer, and memory accessing means for selectively accessing a command code stored in said memory means in accordance with the operation of an input device of said control input means.

19. An apparatus according to claim 18, wherein said second means includes signalling means, responsive to a command code accessed from said memory means, for coupling digital signals representative of said accessed command code to the keyboard input port of said computer.

20. An apparatus according to claim 18, wherein said first means includes third means, coupled to the input devices of said control input means, for generating input command signals representative of the operation of input devices of said control input means and coupling said input command signals to said memory accessing means, in response to which said memory accessing means selectively accesses command codes stored in said memory means.

21. An apparatus according to claim 20, wherein said third means comprises a matrix of electrical switch elements the operation of a respective one of which produces a respective input command signal for accessing a command code stored in said memory means, input devices of said control input means being arranged to be adjacent to respective ones of said electrical switch elements, whereby operation of an input device by said computer use causes the operation of a respective one of said electrical switch elements and the consequential accessing of a command code stored in said memory means.

22. An apparatus according to claim 20, wherein said control input means includes an opto-electrical input device having a mechanically displaceable element and means for optically detecting the movement of said mechanically displaceable element and generating output codes representative of said movement.

23. An apparatus according to claim 22, wherein said third means includes means for controllably accessing command codes stored in said memory means in accordance with said output codes.

24. An apparatus according to claim 20, wherein said third means comprises means for controlling the rate at which said input command signals are coupled to said memory accessing means.

25. An apparatus according to claim 24, wherein said third means includes means for temporarily buffering input command signals generated in response to the operation of input devices of said control input means and coupling input command signals to said memory accessing means at a rate that is compatible with the operation of said computer in the course of its execution of said application program.

26. An apparatus according to claim 18, wherein said first means includes means for enabling said memory means to store selectively variable sets of command codes, each set being associated with a respectively different application program.

* * * * *